(No Model.)

F. T. HOTINE.
Culinary Apparatus.

No. 234,711. Patented Nov. 23, 1880.

Witnesses.
John F. Grant
Wm Huckel

Inventor.
Frederick T. Hotine
per Edw. Brown
attorney.

UNITED STATES PATENT OFFICE.

FREDERICK T. HOTINE, OF PHILADELPHIA, PENNSYLVANIA.

CULINARY APPARATUS.

SPECIFICATION forming part of Letters Patent No. 234,711, dated November 23, 1880.

Application filed August 12, 1880. (No model.)

*To all whom it may concern:*

Be it known that I, FREDERICK THOMAS HOTINE, of Philadelphia, Pennsylvania, have invented a new and useful Culinary Apparatus, of which the following is a specification.

My invention relates to an improved apparatus for making tea and coffee for hotels and restaurants; and the object to be attained is to have the tea or coffee always hot and of fine flavor, uncontaminated by contact with any deleterious oxide from the urn in which it is made.

The accompanying drawings illustrate the apparatus.

Figure 1:
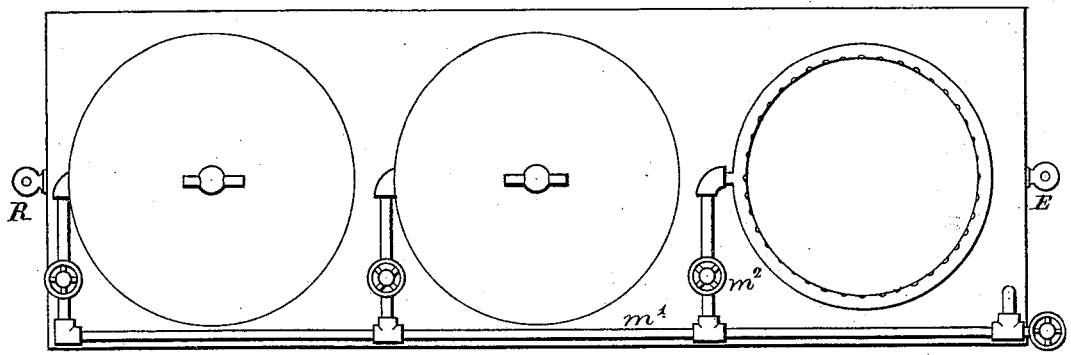
Figure 2:
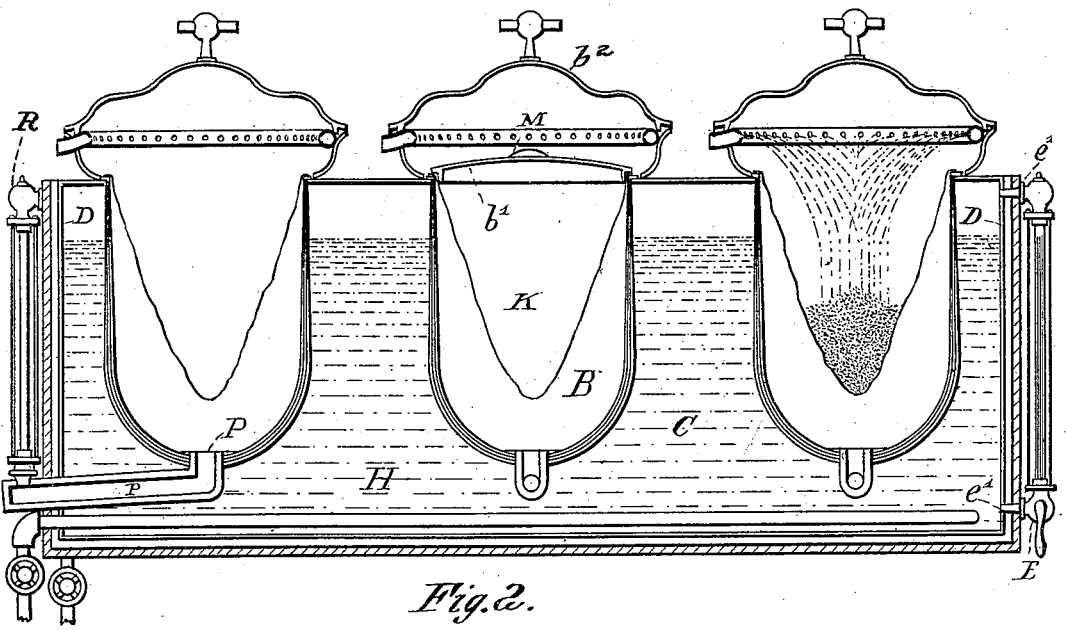

Figure 1 is a plan. Fig. 2 is a vertical section.

The urn itself, B, in which the coffee is made, I make of wrought-iron, covered with hard white porcelain enamel on the inside and blue porcelain outside. This coating prevents the rusting of the iron, and the combination of wrought-iron and enamel avoids the cracking and chipping of the enamel, and consequently the injurious effects upon coffee from the oxide of iron, which forms as soon as the iron surface is exposed. This urn (two or more) I place in a vessel, C, containing hot water, for the purpose of keeping the coffee hot all day long. This vessel or tank is of wood, lined with copper, D, and lagged outside with hard wood for ornamentation. The inclosing of two or more urns in one tank greatly prevents the cooling from radiation which takes place when a single urn is incased.

E is a glass water-gage connected to the tank by cocks $e'$. A coil of steam or hot-water pipe, H, passes around the bottom of the tank, by which the temperature of the coffee can always be regulated.

A bag or strainer, K, is suspended from the neck of the urn. Into this the coffee is placed, and jets of boiling water are forced upon it from a circular pipe, M. The holes in this pipe are so placed that the current of water falls in a general spray upon the surface of the coffee, thereby thoroughly extracting its valuable qualities. These coils are all connected to a main pipe, $m'$, and stop-cocks $m^2$ are placed between the coil and the main pipe to admit the boiling water to any particular urn.

To the bottom of each urn is soldered a pipe, P, connecting with a glass water-gage, R, by which the height of the coffee may always be ascertained. Through this same pipe the tea and coffee are also drawn off for use.

$b'$ is the lid of the urn. $b^2$ is an external lid, which assists in condensing any vapor which may escape past the interior lid, $b'$, so that by these two lids I avoid the necessity of constantly adding fresh water to replace the evaporation.

By this apparatus the coffee can be kept any reasonable length of time, and the last cup drawn will have the same flavor as the first.

I claim—

1. In a coffee-urn, the combination of the wrought-iron vessel B, porcelain-covered inside and out, the bag K, suspended within it, the cover $b'$, the pipe P, and the hot-water tank C, surrounding the vessel B, as herein described.

2. The combination, in a coffee-urn, of a receptacle, B, for holding the coffee, the bag K, suspended within it, the circular coil M, perforated with holes to discharge boiling water in a spray upon the coffee, and the hot-water tank C, substantially as and for the purpose described.

FRED. T. HOTINE.

Witnesses:
FREDK. T. HALL, Jr.,
CHAS. H. CAMPBELL.